Jan. 11, 1944.        R. MAYNE        2,338,817
SELF-LAYING TRACK MECHANISM
Filed May 9, 1942

Inventor
Robert Mayne
By Willis F. Avery
Atty.

Patented Jan. 11, 1944

2,338,817

UNITED STATES PATENT OFFICE 2,338,817

SELF-LAYING TRACK MECHANISM

Robert Mayne, Akron, Ohio, assignor to The B. F. Goodrich Company, New York, N. Y., a corporation of New York Application May 9, 1942, Serial No. 442,297

7 Claims. (Cl. 305—10)

This invention relates to supporting and driving mechanism for self-laying track type vehicles and flexible track therefor and is especially useful in tractors, military tanks, excavators and similar vehicles.

The principal objects of the present invention are to provide for maintaining the driving load at the driving wheel by the sprockets employed for driving the track, and to provide for stability of the track, especially in the presence of mud, gravel or other foreign material which may collect between the drive wheel and the track.

Other objects are to provide for extrusion of mud and other matter from between the track and the drive wheel, to avoid binding of the track on the wheels or dislodgment therefrom as a result of non-uniform ground surface, to provide for facilitating manufacture, and to provide for reliable operation.

These and other objects will appear from the following description and the accompanying drawing.

In accordance with the invention with reference to the illustrative embodiment, the track is supported at its margins by the driving wheel from axially spaced-apart sprockets which seat the end portions of cross-bars of the flexible track and also engage them for driving purposes, while the track may be further guided by lugs on the cross bars which are received by a guiding channel on the periphery of the wheel, the body of the track preferably clearing the face of the driving wheel and the driving wheel preferably being of skeletal form to facilitate extrusion of mud from between the driving wheel and the track.

Figure 1:
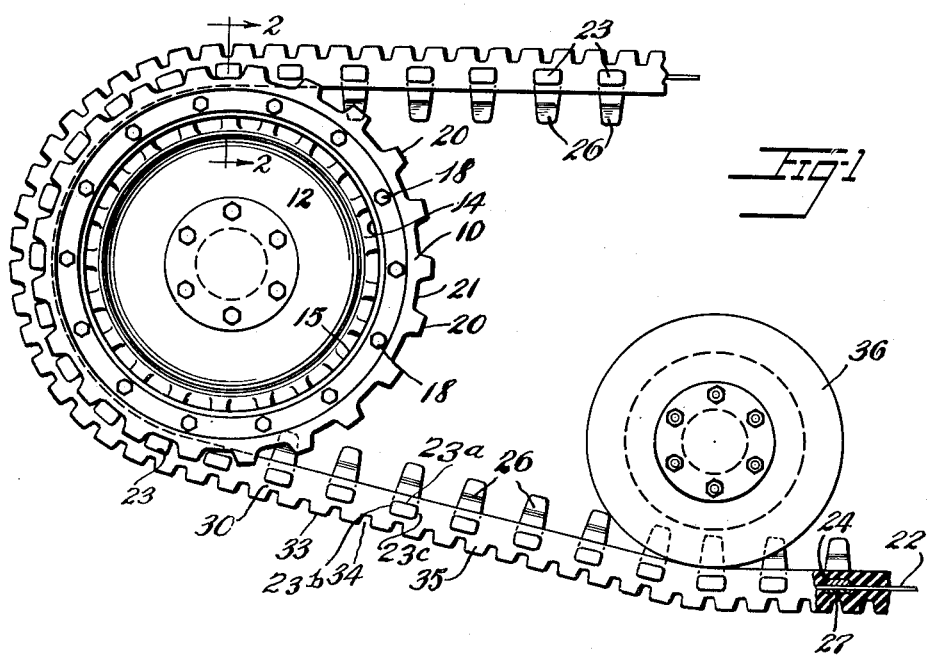
Fig. 1 is a side elevation of a track and associated wheels at the driving end, constructed in accordance with and embodying the invention, parts being broken away and sectioned.
Figure 2:
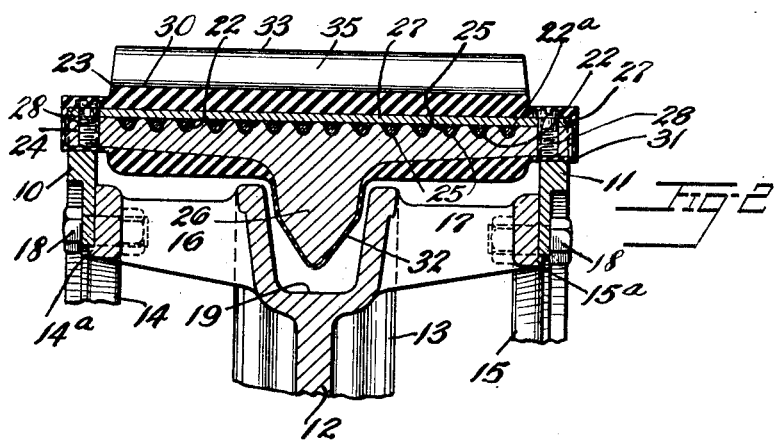
Fig. 2 is a cross-sectional view thereof, taken along line 2—2 of Fig. 1.

Referring to the drawing, the numerals 10, 11 designate a pair of sprocket wheels in the form of rings supported in spaced-apart relation axially of the wheel 12. The wheel is of a skeletal construction to provide for extrusion of mud, and has a central guide channel 13 of annular construction, and a pair of annular sprocket-supporting members 14, 15 spaced therefrom and supported by arms 16, 17 from the channel at circumferentially spaced-apart positions thereabout. Each sprocket-supporting member has an outwardly facing surface and a dowel shoulder 14a, 15a for centering its sprocket, and the sprockets may be secured as by bolts 18 passing through apertures in the sprockets and their supporting members. The outer periphery of the wheel between the side sprockets clears the track as shown in Fig. 2. Openings between the arms 16 and 17 contribute to weight reduction and permit mud to be extruded from between the track and the wheel. The channel 13 provides a guiding groove 19 for receiving lugs of the track as hereinafter more fully explained.

Each of the sprockets 10, 11 is formed with sprocket teeth 20 between which are seats 21 for supporting the track, and the seats of the two sprockets are axially aligned.

The track comprises a flexible tension band of spaced-apart tension members 22, preferably of metallic cable impregnated and surrounded by rubber or other rubber-like cushioning material 22a. At spaced intervals along the tension band corresponding to the circumferential pitch of the sprocket teeth or a multiple thereof, are a plurality of cross-bars 23, 23. Each cross-bar comprises a cross-bar element 24 having grooves 25, 25 in one face thereof for receiving the cables, and a guiding lug 26 on its opposite face for engaging in the channel groove 19 for guiding the track, and a second cross-bar element 27 held against the element 24 by bolts 28 so as to confine the cables in the grooves 25. The grooves 25, 25 preferably are larger in diameter than the cables and are held in the grooves by the intervening rubber-like material 22a bonded to the cables and cross-bar element to transmit driving forces by shear stress of the rubber-like material. The cross-bars 23, 23 are of a length to extend to or beyond the outer faces of the sprockets 10, 11 and the ends of such cross-bars have seat-engaging faces 23a adapted to rest on the opposite seats 21, 21 to support the track from the sprockets clear of the intermediate peripheral portions of the driving wheel and driving faces 23b, 23c, adapted to be engaged by the teeth 20.

A body 30 or wear-resisting material such as rubber composition or other rubber-like material encloses the cables and the cross-bars, preferably extending over the ends of the cross-bars as at 31 to cushion and protect them, and about the guiding lugs 26 as at 32 to quiet their operation and protect them against wear and corrosion. The body 30 may have a tread surface 33 formed of alternate grooves 34, 34 and bars 35, 35 or any other skid-resisting or traction design in the event it is not desired to attach tread blocks, cleats or grousers.

The arrangement is such that on the driving wheel the track is supported entirely at its margin from the seats on the sprocket wheels and may be guided additionally at its center by the engagement of the lugs 26 in the guiding groove 19. This construction permits use of a roughly cast or forged wheel machined only at its sprocket engaging faces. The arms 16, 17 may be of oval cross-section or formed with sharp radially outwardly facing margins affording only small resistance to the extrusion of mud or snow.

The usual weight-supporting bogie wheels, one of which is shown at 36, may be provided for transmitting the weight of the vehicle onto the track.

In addition to the advantage of avoiding difficulties from mud and other foreign matter between the wheel and track the invention makes possible improved stability of the track in the lateral direction as a result of the widely spaced positions of supporting contact at the margins of the track.

Variations may be made without departing from the scope of the invention as it is defined by the following claims.

I claim:

1. A flexible track for a self-laying track-type vehicle, said track comprising a flexible tension structure, a series of cross-bars resiliently secured to said structure at intervals therealong, said cross-bars having end portions extending laterally beyond said structure, which end portions have driving faces for engaging teeth of a sprocketed driving wheel and seat-engaging faces on said end portions for supporting the track upon the driving wheel by contact with seats on said wheel between successive teeth thereof.

2. A flexible track for a self-laying track type vehicle, said track comprising a flexible tension band of laterally spaced apart cables, a series of cross-bars resiliently secured to said cables at intervals along said band, and a body of flexible material enclosing said band and said cross-bars, said cross-bars having end portions extending laterally beyond said band, which end portions have driving faces for engaging teeth of a sprocketed driving wheel and seat-engaging faces on said end portions for supporting the track upon the driving wheel by contact with seats on said wheel between successive teeth thereof.

3. A flexible track for a self-laying track type vehicle, said track comprising a flexible tension band, a series of cross-bars secured to said band at intervals along the band, a body of flexible material enclosing said band and said cross-bars, said cross-bars having end portions extending laterally beyond said band, which end portions have driving faces for engaging teeth of a sprocketed driving wheel and seat-engaging faces on said end portions for sole support of the track upon the driving wheel, and guiding lugs on said track intermediate the margins thereof by contact with seats on said wheel between successive teeth thereof.

4. A self-laying track mechanism comprising a driving wheel and a track adapted to be driven thereby, said driving wheel comprising a pair of axially spaced-apart sprockets having driving teeth separated circumferentially by track-supporting seats between the teeth, said track comprising a flexible tension band, and a series of cross-bars resiliently secured to said band and having end portions extending laterally beyond said band for engaging the track-supporting seats of said sprockets to support the track substantially without engagement of said track with said wheel in the extent between said sprockets.

5. A self-laying track mechanism comprising a driving wheel and a track adapted to be driven thereby, said driving wheel comprising a pair of axially spaced-apart sprockets having driving teeth separated circumferentially by track-supporting seats at the root circumference of said teeth and a guide channel intermediate said sprockets, and said track comprising a flexible tension band, a series of cross-bars resiliently secured to said band at intervals along the same extending laterally beyond said band to support the track upon the track-supporting seats of said sprockets, said cross-bars having guide lugs adapted to enter said guide channel, and the surface of said track in the extent between said sprockets being clear of said wheel.

6. A self-laying track mechanism as defined in claim 5 in which the guide channel of the wheel is separated from the sprockets thereof by an openwork connecting structure facilitating the drainage of foreign matter from between the track and wheel.

7. A self-laying track mechanism comprising a driving wheel and a track adapted to be driven thereby, said driving wheel comprising a pair of axially spaced-apart sprockets having driving teeth separated circumferentially by track-supporting seats at the root circumference of said teeth and a guide channel intermediate said sprockets, and said track comprising a flexible tension band, a series of cross-bars resiliently secured to said band at intervals along the same extending laterally beyond said band to support the track upon the track-supporting seats of said sprockets, said cross-bars having guide lugs adapted to enter said guide channel, and a surface of rubber-like material upon the wheel side of said cross-bars and upon said lugs, said surface of rubber-like material being clear of said wheel in the extent between said sprockets.

ROBERT MAYNE.